(12) United States Patent
Humpert

(10) Patent No.: US 8,365,423 B2
(45) Date of Patent: Feb. 5, 2013

(54) REMOVABLE ARCHERY RANGE FINDER AND RANGE FINDER INSERT

(76) Inventor: Edward J. Humpert, St. Charles, MI (US)

( * ) Notice: Subject to any disclaimer, the term of this patent is extended or adjusted under 35 U.S.C. 154(b) by 67 days.

(21) Appl. No.: 12/319,448

(22) Filed: Jan. 7, 2009

(65) Prior Publication Data
US 2009/0178287 A1 Jul. 16, 2009

Related U.S. Application Data

(60) Provisional application No. 61/011,096, filed on Jan. 15, 2008.

(51) Int. Cl.
*G01C 3/00* (2006.01)
*F41G 1/467* (2006.01)

(52) U.S. Cl. .................. 33/265; 124/87; 124/88

(58) Field of Classification Search .............. 33/265; 124/87–88
See application file for complete search history.

(56) References Cited

U.S. PATENT DOCUMENTS

| | | | | |
|---|---|---|---|---|
| 472,069 A * | 4/1892 | Ord | ................................ | 42/142 |
| 2,574,599 A * | 11/1951 | Stieber | ............................. | 33/265 |
| 2,742,702 A * | 4/1956 | Williams | ............................ | 33/265 |
| 3,698,091 A * | 10/1972 | Merrill et al. | ..................... | 42/144 |
| 4,109,390 A * | 8/1978 | Smith et al. | ....................... | 33/265 |
| 4,570,352 A * | 2/1986 | Leal | ................................ | 33/265 |
| 4,704,800 A * | 11/1987 | Stinson | ............................ | 33/265 |
| 5,579,752 A * | 12/1996 | Nelson et al. | .................... | 33/265 |
| 7,886,448 B2* | 2/2011 | Humpert | ........................... | 33/265 |
| 2009/0007446 A1* | 1/2009 | Humpert | ........................... | 33/265 |
| 2010/0000103 A1* | 1/2010 | Humpert | ........................... | 33/265 |

* cited by examiner

*Primary Examiner* — Yaritza Guadalupe-McCall
(74) *Attorney, Agent, or Firm* — Robert L. McKellar; McKellar IP Law, PLLC

(57) ABSTRACT

An archery range finder that is mounted to a bow sight. The range finder is manufactured such that there is an individual range finder for each type of game. The huntsman selects the range finder that is predetermined in size such that the predetermined sizes will fit the size of the game that is being hunted. For purposes of using these range finders the devices provide an easy and convenient means by which the range finders can be easily attached to a bow sight and removed from the bow sight.

12 Claims, 2 Drawing Sheets

REMOVABLE ARCHERY RANGE FINDER AND RANGE FINDER INSERT

This is an original patent application based on U.S. Provisional patent application having Ser. No. 61/011,096, filed Jan. 15, 2008 from which priority is claimed herein.

BACKGROUND OF THE INVENTION

The invention that is disclosed and claimed herein deals with an archery range finder that is mounted to a bow sight. This invention also deals with an insert that is useful for range finding. The range finder and insert are manufactured such that there is an individual range finder or insert for each type of game. The huntsman selects the range finder or insert that is predetermined in size such that the predetermined sizes will fit the size of the game that is being hunted. For purposes of using these range finders and inserts, the inventor herein has invented and easy and convenient means by which the range finders and inserts can be easily attached to a bow sight and removed from the bow sight.

THE INVENTION

Thus, in one embodiment, this invention deals with a removable range finder for use on an archery bow sight. The range finder comprises a circular base, wherein the circular base has a front surface and a back surface. The front surface has an opening through it.

There is a first insert mounted within the circular base and visible in the opening in the front surface of the circular base, the first insert being composed of a combination of horizontal segments connected together by a series of vertical segments. Each of the vertical segments has a predetermined length and each of the horizontal segments has a predetermined length.

There is a second insert mounted within the circular base. The second insert is composed of a single straight segment. The second insert is mounted a predetermined distance from the first insert and is visible in the opening in the front surface of the circular base. The second insert is mounted parallel with and below the first insert.

In a second embodiment, there is an archery bow sight insert, said insert is comprised of a combination of a series of horizontal segments connected together by a series of vertical segments, each of the vertical segments having a predetermined length and each of the horizontal segments having a predetermined length.

In yet another embodiment, there is an archery bow sight insert, said insert comprised of a combination of a series of horizontal segments connected together by a series of vertical segments, each of the vertical segments having a predetermined length and each of the horizontal segments having a predetermined length wherein the upper end of the insert terminates in a vertical segment and wherein the lower end of the insert terminates in a vertical segment, said lower end vertical segment having a distal end, the distal end of the lower vertical segment having attached thereto, an extended horizontal segment, the opposite end of the extended horizontal segment being attached to the distal end of a vertical segment.

A further embodiment of this invention is a removable range finder for use on an archery bow sight, said range finder comprising a circular base, said circular base having a front surface and a back surface, and said front surface having an opening through it. The base having mounted thereon, a series of at least three spaced apart horizontal bars, the spaces between the horizontal bars being predetermined in width. The spaced apart horizontal bars extend from side to side across the front opening and attach to the circular base where the ends of each bar meet the circular base.

Still other embodiments are a combination of any of the above mentioned archery bow sight range finders or inserts, and a series of sight pins.

A final embodiment is a combination of any of the above mentioned archery bow sight range finders or inserts, and a single sight pin.

DETAILED DESCRIPTION OF THE DRAWINGS

Figures 1, 3:
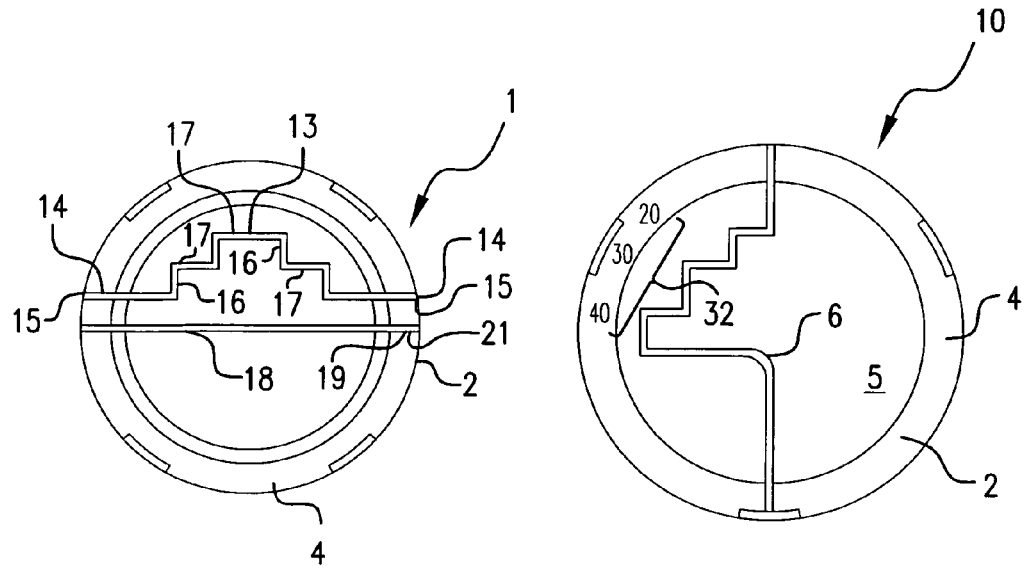
FIG. 1 is full back view of a range finder of this invention.
FIG. 3 is a full front view of another embodiment of a range finder of this invention.

Turning now to FIG. 1, which is a full back view of a range finder 1 of this invention there is shown a circular base 2, wherein the circular base 2 has a front surface 3 (see FIG. 3) and a back surface 4. There is an opening 5 through the front surface 3, and said opening 5 is large enough that the inserts (described infra) can be clearly observed.

The range finders of this invention can be affixed to the front or back of standard archery sights using small screws, a tackifier composition, snap rings, or some other convenient means, the means of attachment requiring only that the range finder can be easily affixed to the archery bow sight and easily removed so that it can be changed for the various game that is being hunted.

There is a first insert 13 mounted within the circular base 2 and this first insert 13 is visible in the opening 5 in the front surface 3 of the range finder 1. The first insert 13 is mounted, in one example, by sliding the ends 14 of the first insert 13 into slots 15 in the circular base 2. However, the manner of holding the first insert 13 within the circular base 2 can be any means which will hold the first insert 13 securely and the manner of securing the first insert 13 is not critical to the invention.

The first insert 13 is a continuous, single piece of material, usually metal or plastic. It is bent such that the vertical segments 16 and the horizontal segments 17 each have a predetermined length. The range finder 1 is nominally about ⅛ inch to about ⅜ inches wide and essentially any thickness that is convenient. It is normally manufactured at about 1/16 inch to about 3/32 inches thick. Preferred is a width of about ¼ inch and a thickness of about 1/16 inch.

There is a second insert 18 within the circular base 2. This second insert 18 is composed of a single straight segment. The second insert 18 is mounted a predetermined distance from the first insert 13 and is also visible in the opening 5 in the front surface of the circular base 2. The second insert 18 is mounted parallel with and below the first insert 13 and is mounted similarly to the first insert 13, that is, by sliding the ends 19 into slots 21 in the circular base 2.

Each of the inserts 13 and 18 can be manufactured from glass, plastic, or metal, especially, aluminum metal, but the material of construction is not critical as long as it is stabile enough to withstand the outdoor elements and minor physical abuse that outdoor equipment is subject to.

Each of the horizontal segments 17 and the second insert 18 provide the range finding capability of this invention. Thus, it is known the average distance of the body of an animal from the line of the back of the animal (back line) to the belly line of the animal at various given distances. The horizontal segments 17 and the second insert 18 and set apart those distances, to provide accurate targets at, for example, 5 yards, 10 yards, 20 yards, 30 yards, 40 yards, and as much as 70 yards, and when in use, the huntsman only has to place the range finder horizontal segment 17 on the back of the animal and the second insert 18 on the belly line of the animal and the huntsman will immediately know the distance that the animal is away from the huntsman. Then immediately, the huntsman knows which sight pin 28 to use for the shot at the animal. Thus, there are no adjustments of the bow sight or range finder to allow for an immediate shot at the target and the hunter can move his or her eye from the range finder to the sight pins without having to lower the bow or adjust any of the equipment to do so.

For example, if the huntsman finds that the horizontal bar 17 for the 20 yard marker is on the back of the animal, and the second insert is on the belly, then the shot is 20 yards and then the huntsman sights on the pin on the bow sight to make the shot.

From the above, it can be easily determined that the length of the vertical segments 16 are critical to this invention.

A similar range finder can be found in my co-pending patent application Ser. No., 60/958,234, filed Jul. 3, 2007, but those range finders are disks that are adapted to fit inside the bow sight.

Figure 6:
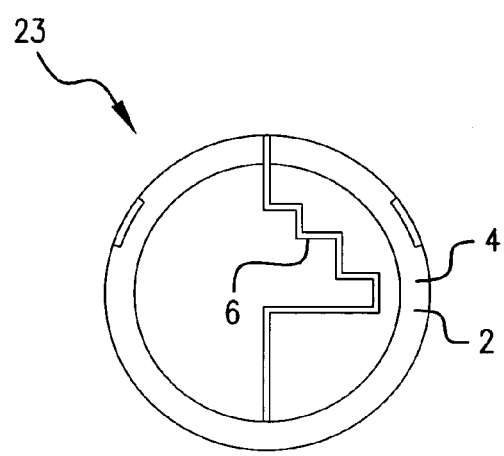
FIG. 6 is a full back view of another embodiment of this invention.

Another embodiment of this invention is shown in FIG. 3 as 10. This embodiment is similar to that found in FIG. 1, but shows a vertical insert 6 that is mounted vertically in the circular base 2. This mounting of the insert 6 allows for the use of a device that will allow for range finding animals from the right or from the left. Contemplated within the scope of this invention is a similar device 23 (shown in FIG. 6) wherein the vertical insert 6 is mounted on the right hand side of the circular base 2. Essentially, the device 23 is a mirror image of the device 10 (FIG. 3), wherein the insert 6 is mounted in the same manner as in the device 10. This range finder insert 6 is comprised of a combination of a series of horizontal segments 8 connected together by a series of vertical segments 9, each of the vertical segments 9 having a predetermined length and each of the horizontal segments 8 having a predetermined length wherein the upper end 31 of the insert 6 terminates in a vertical segment 34. The lower end 35 of the insert 6 terminates in a vertical segment 36, the lower end 35 of the vertical segment 36 has a distal end 37, the distal end 37 of the lower vertical segment 36 has attached thereto, an extended horizontal segment 38, the opposite end 39 of the extended horizontal segment 38 is attached to the distal end 40 of a vertical segment 41. The extended horizontal segment 38 is extended in length in order to provide the same role as the second insert 18 of the device shown in FIG. 1, that is, as a belly line for the device. By "extended", it is meant that this horizontal segment 38 is longer than any other of the horizontal segments 8 in the insert 6, and extends from the lower vertical segment 36 to a line that aligns with the vertical segment 34.

Figure 5:
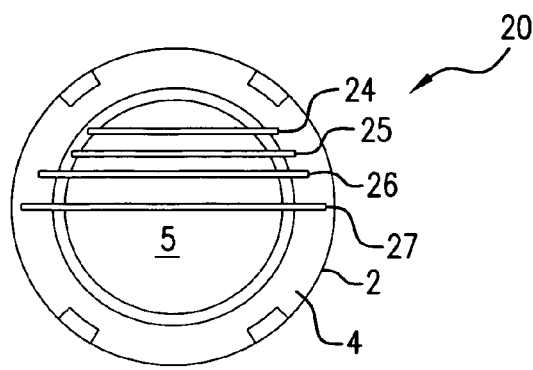
FIG. 5 is a full back view of another embodiment of this invention.

FIG. 5 shows yet another embodiment of this invention wherein the insert 13 is constituted of individual straight bars 24, 25, and 26 that substitute for each of horizontal segments, respectively, 20 yards, 30 yards, and 40 yards, it being understood that these bars and the inserts of the other devices of this invention can be configured to read anywhere from about 5 yards to about 80 yards, the most common distances for the bow being about 15 yards, 20 yards, 30 yards, and 40 yards.

The bottom bar 27 is essentially equivalent to the second insert 18 found in FIG. 1. The horizontal bars 24, 25, and 26 are mounted such that they extend from side to side of the circular base 2 and are attached to the circular base 2 at the point that the ends of the horizontal bars 24, 25, and 26 meet with and interface with a the flat surface of the circular base 2.

Figures 2, 4:
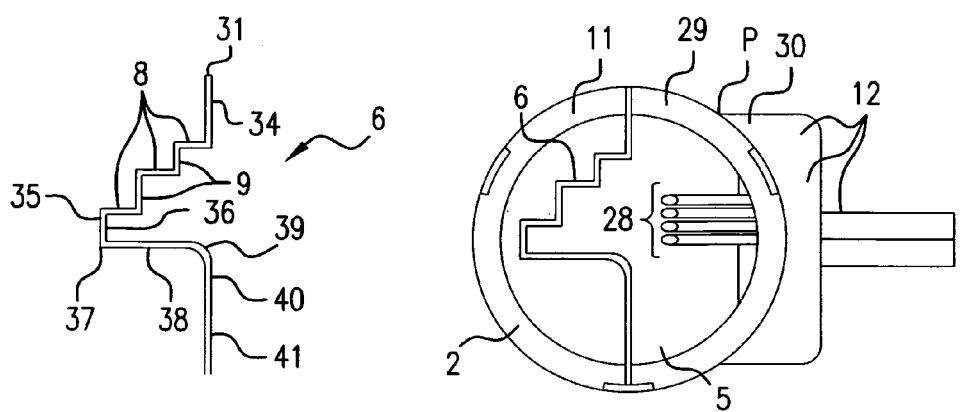
FIG. 2 is a full back view of the range finder insert.
FIG. 4 is a full back view of a bow sight with a range finder of this invention mounted thereon showing the sight pins.

Turning now to FIG. 4, there is shown a range finder as shown in FIG. 3, mounted on an archery bow sight 12. There is shown the circular base 2, the vertical insert 6, the pin sights 28, the back edge 11 of the bow sight 12, back end 29 of the bow sight 12, bow sight base 30, and the opening 5 in the circular base 2.

In use, the range finder is slipped unto the front of a bow sight 12 and can be held on by friction of the range finder 1 to the bow sight outer surface or screwed onto the bow sight. In the event that one is relying on friction to hold the ranger finder 1 on the bow sight 12, it should be understood that the range finder 1 can rotate around the outside of the bow sight 12 and thus, the range finder 1 should be placed on the bow sight 12 such that it will not rotate around the bow sight and in FIG. 4, it can be placed such that it encounters the base 30 of the bow sight 12, at point P, to prevent this rotation.

Figure 7:
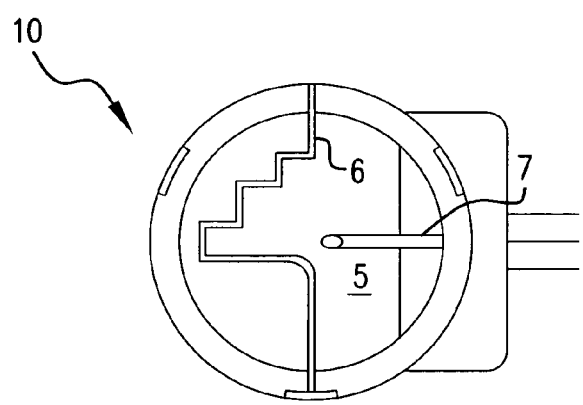
FIG. 7 is a full back view of another embodiment of this invention wherein there is shown a single pin sight.

FIG. 7 shows a range finder of this invention with an insert 6 in the opening 5 of the circular base 2 and wherein there is also shown a single pin sight 7.

The ranger finders of this invention can be manufactured from glass, plastic or metal, or a combination of glass, or plastic and metal. It is also contemplated within the scope of this invention to mount the insert on the front of the archery bow sight as well as the back of the archery bow sight.

In addition, it is contemplated within the scope of this invention to place numbers on the back surface 4 of the circular base 2 such that the range in yards is shown as in FIG. 3 at 32.

What is claimed is:

1. A removable range finder for use on an archery bow sight, said range finder comprising:
   a. a circular base, said circular base having a front surface and a back surface, and said front surface having an opening therethrough;
   b. a first insert mounted within the circular base and visible in the opening in the front surface of the circular base, said first insert composed of a combination of horizontal segments connected together by a series of vertical segments, each of the vertical segments having a predetermined length, each of the horizontal segments having a predetermined length;
   c. a second insert mounted within the circular base, said second insert composed of a single straight segment, said second insert being mounted a predetermined distance from the first insert and visible in the opening in the front surface of the circular base and said second insert being mounted parallel with and below the first insert.

2. In combination, an archery bow sight and a range finder as claimed in claim 1.

3. In combination, an archery bow sight having multiple sight pins and a range finder as claimed in claim 1.

4. In combination, an archery bow sight having a single sight pin and a range finder as claimed in claim 1.

5. A removable range finder for use on an archery bow sight, said range finder comprising in combination:
   a. a circular base, said circular base having a front surface and a back surface, and said front surface having an opening therethrough;

b. range finder insert, said insert comprised of a combination of a series of horizontal segments connected together by a series of vertical segments, each of the vertical segments having a predetermined length and each of the horizontal segments having a predetermined length wherein the upper end of the insert terminates in a vertical segment and wherein the lower end of the insert terminates in a vertical segment, said lower end vertical segment having a distal end, the distal end of the lower vertical segment having attached thereto, an extended horizontal segment, the opposite end of the extended horizontal segment being attached to the distal end of a vertical segment.

6. In combination, an archery bow sight and a range finder as claimed in claim 5.

7. In combination, an archery bow sight having multiple sight pins and a range finder as claimed in claim 5.

8. In combination, an archery bow sight having a single sight pin and a range finder as claimed in claim 5.

9. A removable range finder for use on an archery bow sight, said range finder comprising:
  c. a circular base, said circular base having a front surface and a back surface, and said front surface having an opening therethrough;
  d. said base having mounted thereon, a series of at least three spaced apart horizontal bars, the spaces between the horizontal bars being predetermined in width;
  e. said spaced apart horizontal bars extending from side to side across the front opening and attaching to the circular base where the ends of each bar meet the circular base.

10. In combination, an archery bow sight and a range finder as claimed in claim 9.

11. In combination, an archery bow sight having multiple sight pins and a range finder as claimed in claim 9.

12. In combination, an archery bow sight having a single sight pin and a range finder as claimed in claim 9.

* * * * *